(12) United States Patent
Shekh-Yusef et al.

(10) Patent No.: US 11,115,217 B2
(45) Date of Patent: Sep. 7, 2021

(54) SYSTEMS AND METHODS FOR DETECTING DEVICE LOCATION AND USAGE

(71) Applicant: Avaya Inc., Santa Clara, CA (US)

(72) Inventors: Rifaat Shekh-Yusef, Belleville (CA); Gregory Pelton, Raleigh, NC (US)

(73) Assignee: Avaya Inc., Santa Clara, CA (US)

( * ) Notice: Subject to any disclaimer, the term of this patent is extended or adjusted under 35 U.S.C. 154(b) by 235 days.

(21) Appl. No.: 16/198,221

(22) Filed: Nov. 21, 2018

(65) Prior Publication Data
US 2020/0162262 A1 May 21, 2020

(51) Int. Cl.
*H04L 9/32* (2006.01)
*H04L 29/06* (2006.01)

(52) U.S. Cl.
CPC .......... *H04L 9/3236* (2013.01); *H04L 9/3263* (2013.01); *H04L 63/107* (2013.01)

(58) Field of Classification Search
None
See application file for complete search history.

(56) References Cited

U.S. PATENT DOCUMENTS

| | | | | |
|---|---|---|---|---|
| 8,209,394 B2* | 6/2012 | Guo | ........................ | G06F 21/73 709/217 |
| 8,413,885 B2 | 4/2013 | Frad et al. | | |
| 8,745,698 B1* | 6/2014 | Ashfield | ................ | G06Q 40/02 726/4 |
| 8,819,769 B1* | 8/2014 | van Dijk | ............. | H04L 63/0876 726/1 |
| 9,178,859 B1 | 11/2015 | Ortiz et al. | | |
| 9,473,511 B1 | 10/2016 | Arunkumar et al. | | |
| 9,887,980 B1* | 2/2018 | Balmakhtar | ............ | H04L 63/08 |
| 2003/0005316 A1* | 1/2003 | Girard | ..................... | G06F 21/88 713/193 |
| 2010/0103876 A1* | 4/2010 | Aso | ..................... | H04W 60/005 370/328 |
| 2010/0323700 A1* | 12/2010 | Bachmann | ............ | H04W 36/14 455/436 |
| 2012/0187185 A1 | 7/2012 | Sayan | | |
| 2012/0203663 A1* | 8/2012 | Sinclair | ............... | G06F 21/6254 705/26.41 |
| 2014/0108800 A1* | 4/2014 | Lawrence | ............. | H04L 63/123 713/168 |
| 2015/0066762 A1* | 3/2015 | Chatterton | .............. | G06F 21/44 705/44 |

(Continued)

OTHER PUBLICATIONS

Abdurrahman, "A New Mobile-Based Multi-Factor Authentication Scheme Using Pre-Shared Number GPS Location And Time Stamp", 2013, IEEE, pp. 293-295. (Year: 2013).*

(Continued)

*Primary Examiner* — Benjamin E Lanier
(74) *Attorney, Agent, or Firm* — Stevens & Showalter LLP

(57) ABSTRACT

Systems and methods for detecting misuse of devices comprising: receiving, from a device, a message comprising a first hash of device data that is indicative of a current device location and usage; generating a second hash of stored data, the stored data being based on an expected location and usage associated with the device; comparing the first and second hashes; and when the first and second hashes do not match, generating an alert.

17 Claims, 10 Drawing Sheets

(56) References Cited

U.S. PATENT DOCUMENTS

| | | | | |
|---|---|---|---|---|
| 2016/0063847 A1* | 3/2016 | Hawkins | ............... | H04W 4/02 |
| | | | | 340/539.11 |
| 2016/0205094 A1* | 7/2016 | Harthattu | ............. | H04W 4/029 |
| | | | | 455/411 |
| 2017/0006417 A1* | 1/2017 | Canoy | ................. | H04W 12/10 |
| 2017/0308941 A1 | 10/2017 | Hipolito et al. | | |
| 2018/0006839 A1* | 1/2018 | Juneau | ................... | H04L 63/14 |
| 2018/0288035 A1 | 10/2018 | Shekh-Yusef | | |
| 2020/0082401 A1* | 3/2020 | Arora | .................. | H04L 9/3297 |

OTHER PUBLICATIONS

Rifaat Shekh-Yusef et al.; Related U.S. Appl. No. 17/444,093 entitled "Systems and Methods for Detecting Device Location and Usage"; filed Jul. 30, 2021.

* cited by examiner

SYSTEMS AND METHODS FOR DETECTING DEVICE LOCATION AND USAGE

BACKGROUND

The present disclosure relates generally to systems and methods for detecting misuse of a device, and, more particularly, to detecting misuse based on a location and/or usage of the device.

Manufacturers enter into agreements with entities such as service providers and resellers to distribute and sell goods and services. These agreements typically specify pricing based on geographical region or location and may also include additional limitations on, for example, device usage. The grey market refers to the distribution and sale of non-counterfeit goods and services outside an intended or authorized distribution channel. In general, an entity may purchase a product in a first market where it is available at a lower price and then resell the product in a second market at a price that is higher than the original purchase price but lower than the market price in the second market. A customer who purchases a grey market product is typically unaware that there is a problem. These practices, along with improper usage of devices, reduce revenue for manufacturers and authorized partners and may also cause damage to the image and reputation of a brand or company. Attempts to combat these activities include, for example, monitoring secondary markets and imports for evidence of grey market goods, refusing to honor warranties of suspected grey market products, conducting audits of partners, and conducting random test purchases.

BRIEF SUMMARY

One aspect of the present disclosure relates to a system comprising a memory storing executable instructions; and a processor in communication with the memory, in which the processor when executing the executable instructions: receives, from a device, a message comprising a first hash of device data that is indicative of at least one of a current device location or a current device usage; generates a second hash of stored data, the stored data being based on at least one of an expected location or an expected usage associated with the device; compares the first and second hashes; and when the first and second hashes do not match, generates an alert.

Another aspect of the present disclosure relates to a method comprising: receiving, by a processor, from a device, a message comprising a first hash of device data that is indicative of at least one of a current device location or a current device usage; generating, by the processor, a second hash of stored data, the stored data being based on at least one of an expected location or an expected usage associated with the device; comparing, by the processor, the first and second hashes; and when the first and second hashes do not match, generating, by the processor, an alert.

A further aspect of the present disclosure relates to a computer-readable medium comprising instructions that when executed, cause a processor of a device to: in response to detecting a boot-up of the device, automatically extract first device data indicative of at least one of a current device location or a current device usage; generate a nonce; create hashed first device data comprising a hash of the first device data and the nonce; and automatically transmit a message comprising the nonce and the hashed first device data to an external system via a public network.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "computer-readable medium" and "computer-readable storage medium" as used herein refer to any tangible storage and/or transmission medium that participates in storing and/or providing instructions to a processor for execution. Such a medium may take many forms, including, but not limited to, non-volatile media (e.g., non-volatile random access memory (NVRAM), magnetic disks, and/or optical disks), volatile media (e.g., dynamic memory, such as main memory), and transmission media and may comprise an electronic, magnetic, optical, electromagnetic, infrared, or semiconductor system, apparatus, or device, or any combination thereof.

The terms "determine," "calculate," "compute," and variations thereof, as used herein, are used interchangeably and may include any type of methodology, process, mathematical operation or technique.

The term "certificate," as used herein, refers to cryptographic digital data files utilized to certify, at least in part, an electronic device. The term, "signature," as used herein, is a data scheme or the result of other algorithmic operation such as to generate a hash, at least in part, from a private key and may be validated using a certificate associated with the private key. At no point does the term "signature" or "certificate," as used herein, refer to the act of a human signing or the presence of a human signature on a physical document.

Figure 1:
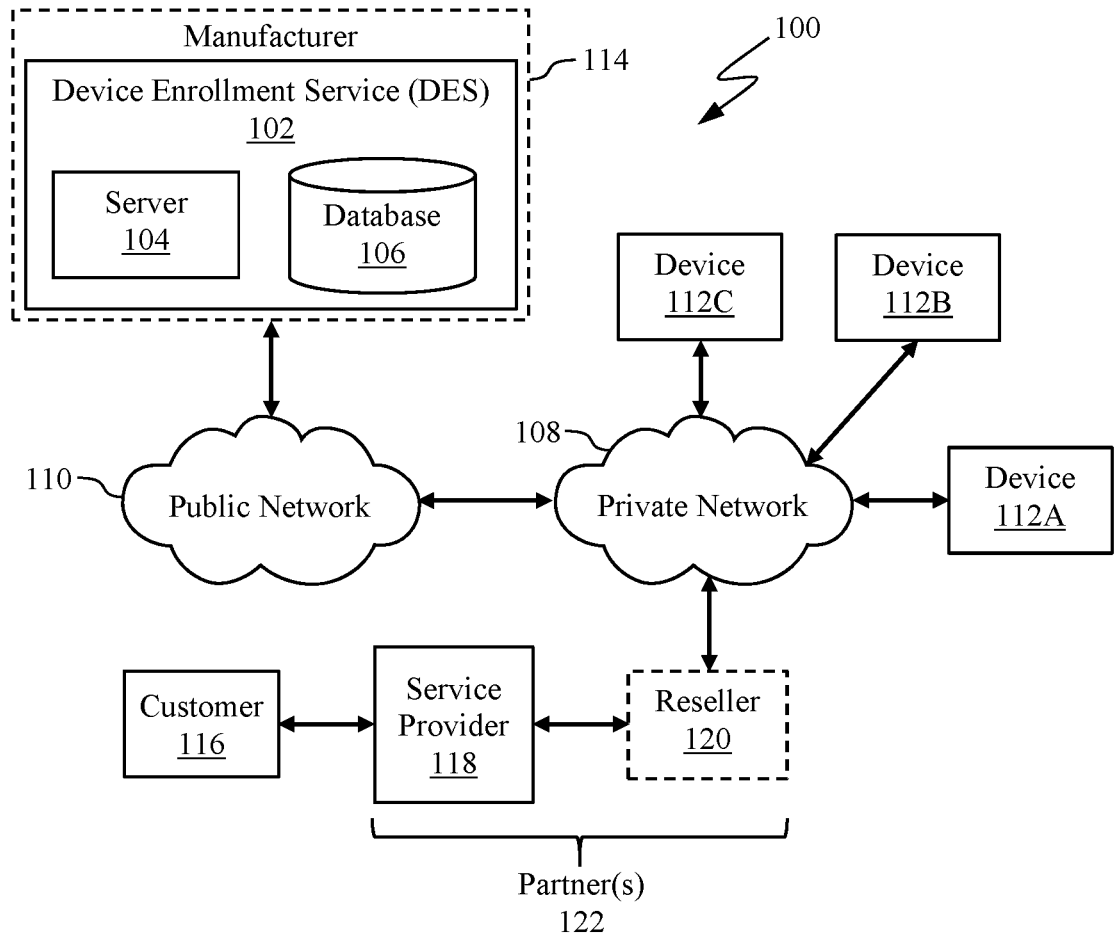
FIG. 1 depicts a system in accordance with the present disclosure.

As shown in FIG. 1, a system 100 for configuring and authenticating devices comprises a Device Enrollment Service (DES) 102. The structure and operation of system 100 is explained in greater detail in U.S. Patent Application Publication No. 2018/0288035 (assigned to applicant), which is hereby incorporated by reference in its entirety. DES 102 may comprise a server 104 in communication with one or more processors (not shown) coupled to a database 106. DES 102 may be attached to a private network 108 via a public network 110 (e.g., the Internet), as shown in FIG. 1, or directly (not shown) to the private network 108. In some examples, DES 102 may be hosted or controlled by a device manufacturer 114, and in other examples, DES 102 may be a third party service that is separate from the device manufacturer 114. It is understood that all references to DES 102 made herein are intended to include both configurations of DES 102.

A plurality of endpoints or devices 112A-112C (referred to herein collectively as devices 112) may be attached to the private network 108, as shown in FIG. 1, or directly to the public network 110 (not shown). The devices 112 may comprise a variety of electronic devices and components that are capable of being connected to a network and may communicate with other devices 112 attached to the private and/or public networks 108, 110. For example, one or more of the devices 112 may comprise a digital telephone that uses Session Initiation Protocol (SIP) and/or other packet-based protocol; a softphone comprising a digital telephonic component embodied on a computing device, such as a personal computer; a smartphone; and/or another device comprising packet-based communication components. With reference to representative device 112A in FIG. 2A, each device 112 comprises a processor 112A-1 in communication with a memory 112A-2 comprising executable instructions stored thereon.

With reference to FIG. 1, DES 102 may comprise multiple interfaces, including an administrator interface that enables an enterprise to manage the services provided by DES 102 and to load the device certificates and associated MAC addresses onto the respective devices 112; a manufacturer interface that enables the manufacturer 114 of the devices 112 to load the certificates to DES 102; a service provider interface that enables service providers 118 to manage a service provider profile on DES 102 and associate the devices 112 to the service provider profile; a reseller interface that enables resellers 120 to associate the devices 112 with the service provider profile; and a device interface, which comprises a programmatic application program interface (API) to enable the devices 112 to be authenticated and redirected to connect to a specific service provider's interface.

During manufacture, the device manufacturer 114 may issue an instruction to each device 112 to generate a certificate or a certificate may be loaded into the devices 112. In response to the instruction, each device 112 generates a self-signed certificate, which may include one or more pieces of information specific to the device 112 (e.g., a serial number, a model number, a date of manufacture, a MAC address, a private key, etc.). Generating the self-signed certificate may comprise creating a hash of the certificate, such as using SHA256 or other hashing algorithm. The hash of the certificate is then provided to DES 102, along with one or more unique identifiers for each device 112, such as the MAC address, serial number, etc. DES 102 stores this information, e.g., in the database 106, in a record associated with each device 112 for later use in authenticating the devices 112. The record may also include a hardware configuration of each device 112.

A customer 116 may request a device, e.g., device 112A. The service provider 118 may directly supply the device 112A or may optionally utilize a reseller 120, in which case the service provider 118 may forward the customer's request to the reseller 120. The service provider 118 and/or reseller 120 may send one or more messages to DES 102. The message(s) may comprise a unique identifier for the device 112A (e.g., a MAC address, serial number, etc.) and/or other identifier (such as an enrollment code) that allows DES 102 to associate the device 112A with a respective one of the service provider 118 or the reseller 120. The message(s) may also comprise instructions to associate the device 112A with the customer 116 or a customer site. The device 112A is then delivered or otherwise made available to the customer 116. In other examples, the customer 116 may request the device 112A directly from the manufacturer 114, in which case the manufacturer 114 associated the device 112A with the customer 116 and ships or otherwise makes the device 112A available to the customer.

When the device 112A is booted-up for the first time and attempts to connect to a network of the customer 116, the device 112A is not trusted and may have limited functionality, e.g., the device 112A may have the capacity only to communicate with those components needed to authorize and/or authenticate the device 112A. Following boot-up, the device 112A (via the executable instructions stored in the memory 112A-2 of the device 112A) initiates a secure communication with DES 102. For example, a mutually authenticated communications channel may be established when the device 112A transmits a hash of its self-signed certificate to DES 102. The device 112A may also transmit a request to DES 102 to receive configuration information, such as an address of a provisioning server (not shown). DES 102 verifies that the hash of the certificate matches the stored hash associated with the device 112A, i.e., the device 112A is known to DES 102. DES 102 then transmits a DES-signed certificate and the address of the provisioning server, if requested. Using the DES-signed certificate, the device 112A obtains the necessary configuration information from the provisioning server. The device 112A may also present the DES-signed certificate to a service provider (not shown) associated with the customer's network, which validates the certificate and adds the device 112A to a list of trusted devices that are allowed to utilize the customer's network.

Manufacturers 114 may enter into an agreement with one or more service providers 118 and/or resellers 120 (hereinafter collectively referred to as partners 122) to sell devices 112. These agreements may place a variety of limitations on the location and/or usage of the devices 112. For example, the agreement may specify that the devices 112 are to be sold at different prices in one or more different geographical locations and/or regions. For example, the devices 112 may be sold at a first price in a lower price region and at a second, higher price in a higher price region. The manufacturer 114 may agree to provide special discounts and/or promotions that allow the partner 122 to purchase a device 112A from the manufacturer 114 at a lower price, and in exchange, the partner 122 agrees to sell the device 112A only in authorized regions specified in the agreement. However, the partner 122 may then ship the device 112A to the higher price region, where the device 112A is sold at a price that is lower than the manufacturer's price for that region but higher than the price at which the partner 122 agreed to sell the device 112A in the lower price region. When the device 112A is an authentic product that is sold in an unauthorized region, it is a grey market device 112A'. The agreement may include additional restrictions on the device location and/or usage that may affect billing. For example, the partner 122 may purchase a specified number of licenses for devices 112 at a particular location or site, but the partner 122 may sell more devices 112 to the customer 116 than allowed by the agreement. The devices 112 may also be used in a device-as-a-service (DaaS) arrangement, in which the customer 116 is provided with a predetermined number of devices 112 and/or a predetermined menu of device services and/or features that may vary over a specified time period. Certain usage of the devices, services, and/or features outside the specified time period may be a violation of the agreement.

These activities can be difficult to detect in a timely and efficient manner. Currently, the information transmitted between DES 102 and the device 112A in the system 100 of FIG. 1 contains only the data necessary for DES 102 to authenticate and authorize the device 112A and is insufficient to permit the manufacturer 114 or other interested entity to detect grey market activities or other misuse of the device 112A. In addition, the device 112A would generally not contact DES 102 again following the initial configuration and authentication, unless the device 112A is released and/or otherwise needs to be associated with a different entity or site. Current methods for detecting grey market activities and other misuse often require time- and cost-intensive monitoring by the manufacturer to identify the potential misuse and the partners suspected of engaging in the misuse. In addition, some of these methods rely on the user or a third party to collect and transmit the data and may fail to adequately safeguard the customer's data and privacy.

Systems and methods in accordance with the present disclosure leverage existing DES architecture, e.g., the system 100 shown in FIG. 1, to automatically detect and flag potential grey market activities and other anomalies based on a device's location and/or usage. The device may be programmed to contact DES on initial boot-up for purposes of authenticating the device, as described above, and the manufacturer may further program the device to continue automatically contacting DES at certain times following authentication, such as upon detection of a predetermined event, e.g., upon every boot-up. This programming may form a portion of a firmware of the device. The device may transmit a message with data that is indicative of the device's current location and/or usage, which may be compared by DES to stored data. If there is a discrepancy with the device's current location and/or usage, the device may have been deployed in a manner that violates the agreement with the manufacturer, used and an alert may be generated. Because some or all of the device data is hashed before being transmitted, the customer's information is protected, as the device data generally cannot be reconstructed from the hash. In addition, the process of transmitting the message(s) to DES is automated, such that there is no need to rely on the user to voluntarily send the data, nor is there any need to rely on a third party to collect and transmit the data. Furthermore, the device is programmed to automatically contact DES, which increases the difficulty for the user or other party to tamper with or alter the device data or prevent the device from sending the data.

Figure 2A:
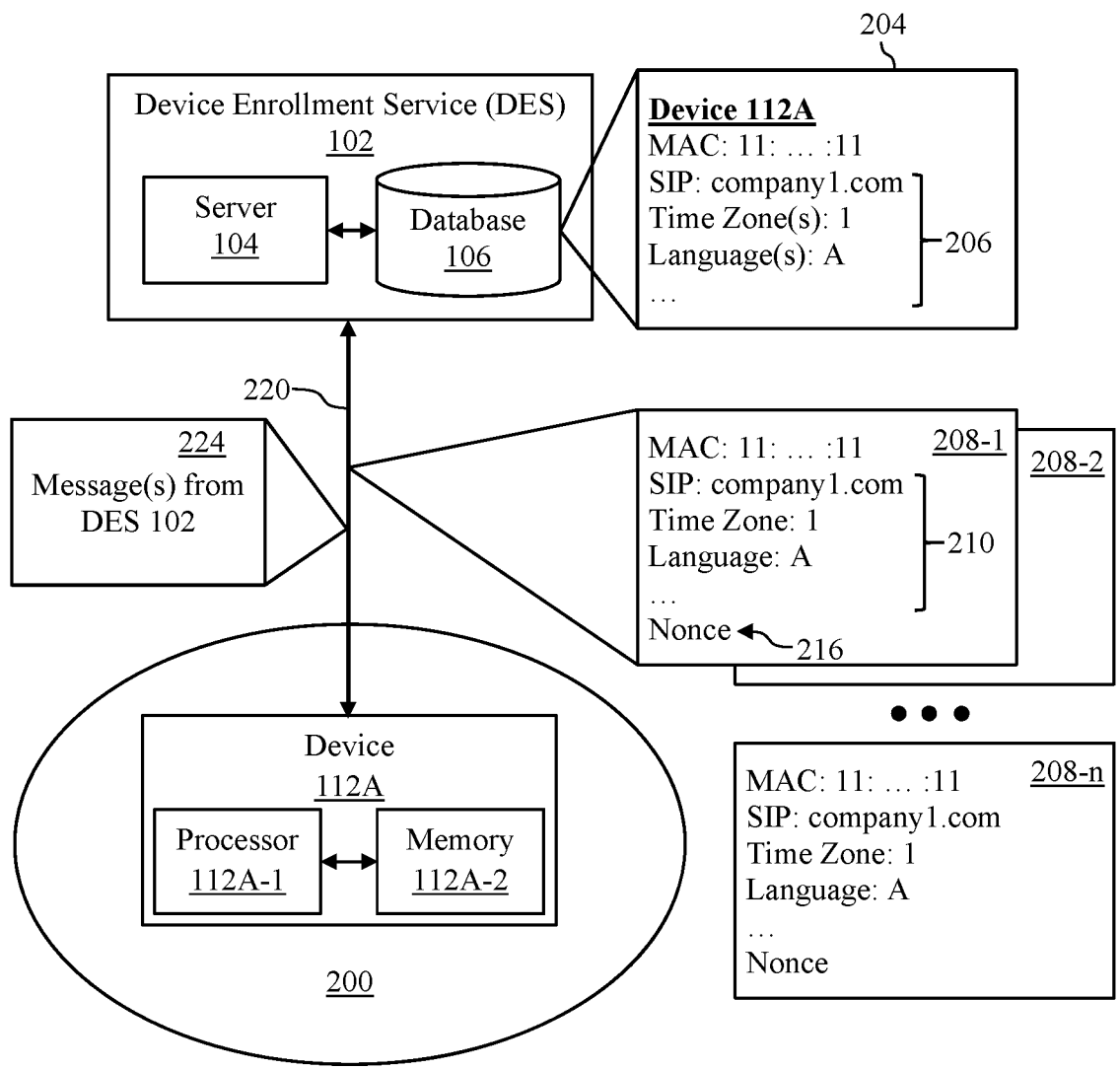
FIG. 2A depicts a first interaction in accordance with the present disclosure.

With reference to FIGS. 1 and 2A, a device, e.g., device 112A, may be sold to a partner 122 under an agreement that, for example, authorizes the partner 122 to sell the device 112A at a certain price in an authorized deployment region, which is represented by reference numeral 200. Based on the authorized deployment region 200, DES 102 generates stored data 204 that includes expected location and usage data 206 and associates the stored data 204 with the device 112A, e.g., based on the MAC address of the device 112A or other unique device identifier. The expected location and usage data 206 may comprise, for example, an expected SIP domain with which the device 112A is to be associated; a Domain Name System (DNS) domain; one or more expected time zones associated with the authorized deployment region 200; one or more configured languages (e.g., the language that the customer selects for the device 112A); emergency numbers (e.g., how the device is configured to dial emergency numbers); and the device's dial plan.

The expected location and usage data 206 may also comprise information related to an expected posture of the device 112A, e.g., how the device 112A is expected to be used. For example, the device 112A may include a variety of features and services, such as international calling, call forwarding, video calling, etc. The agreement under which the device 112A was sold may specify that only a subset of those features and/or services are to be activated or turned on, and the expected location and usage data 206 may comprise a list of those features and/or services that are authorized for the device 112A. The expected location and usage data 206 may further comprise information about one or more local servers and/or other systems (not shown) to which the device 112A is connected, such as a public Internet Protocol (IP) address of a DNS server and/or a public IP address of a Network Time Protocol (NTP) server. The stored data 204 for the device 112A may be stored in the database 106 along with the device certificate, serial number, etc. as part of the record associated with the device 112A. In the particular example shown in FIG. 2A, the expected location and usage data 206 of the device 112A in the authorized deployment region 200 comprises company1.com, time zone 1, and language A.

When the partner 122 provides the device 112A to the customer 116, the device 112A initially communicates with DES 102 as described above to authenticate and configure the device 112A for use on the customer's network. With reference to FIG. 2A, following authentication and configuration as described above, the device 112A then automatically transmits one or more messages 208-1 to 208-n (collectively referred to herein as message(s) 208) to an external system, e.g., DES 102, in accordance with the present disclosure. Each message 208 comprises device data 210 that is indicative of a current device location and/or usage, some or all of which may be hashed as described below. Each time the device 112A prepares to generate a message 208, the device 112A may also generate a nonce 216 that is used one time. The nonce 216 may comprise, for example, a random number. Using SHA256 or other suitable hashing algorithm, the device 112A then creates hashed device data that comprises a hash of the device data 210 and the nonce 216. The message 208 sent to DES 102 comprises the nonce 216 and the hashed device data. Establishing the secure communications channel 220 and hashing the device data 210 with the nonce 216 before transmission of the message 208 helps to protect the customer's identity and privacy.

The device data 210 that is hashed comprises data that is customer-specific, i.e., data that could potentially be used to identify a customer and/or could contain private or confidential customer information. Customer-specific data may comprise, for example, a current SIP domain of the device 112A, a current time zone, data related to a current posture of the device 112A (e.g., which features and/or services have been activated on the device 112A), a configured language, emergency numbers, and/or the device's dial plan, as described above. Alternatively, or in addition, the message 208 may comprise other data that is generally not customer-specific and is not hashed, such as a hardware configuration of the device 112, a DNS domain name, a public IP address of a DNS server and/or a public IP address of a NTP server. The device 112A may extract the device data 210 from the device 112A, e.g., from the memory 112A-2 of the device 112A, and/or from the server (not shown) or other external entity to which the device 112A is connected. Some data, such as the public server address, may be provided, for example, in a header (not shown) of the message 208. The message 208 may further comprise a timestamp that indicates a date and time when the message 208 was generated.

Figure 2B:
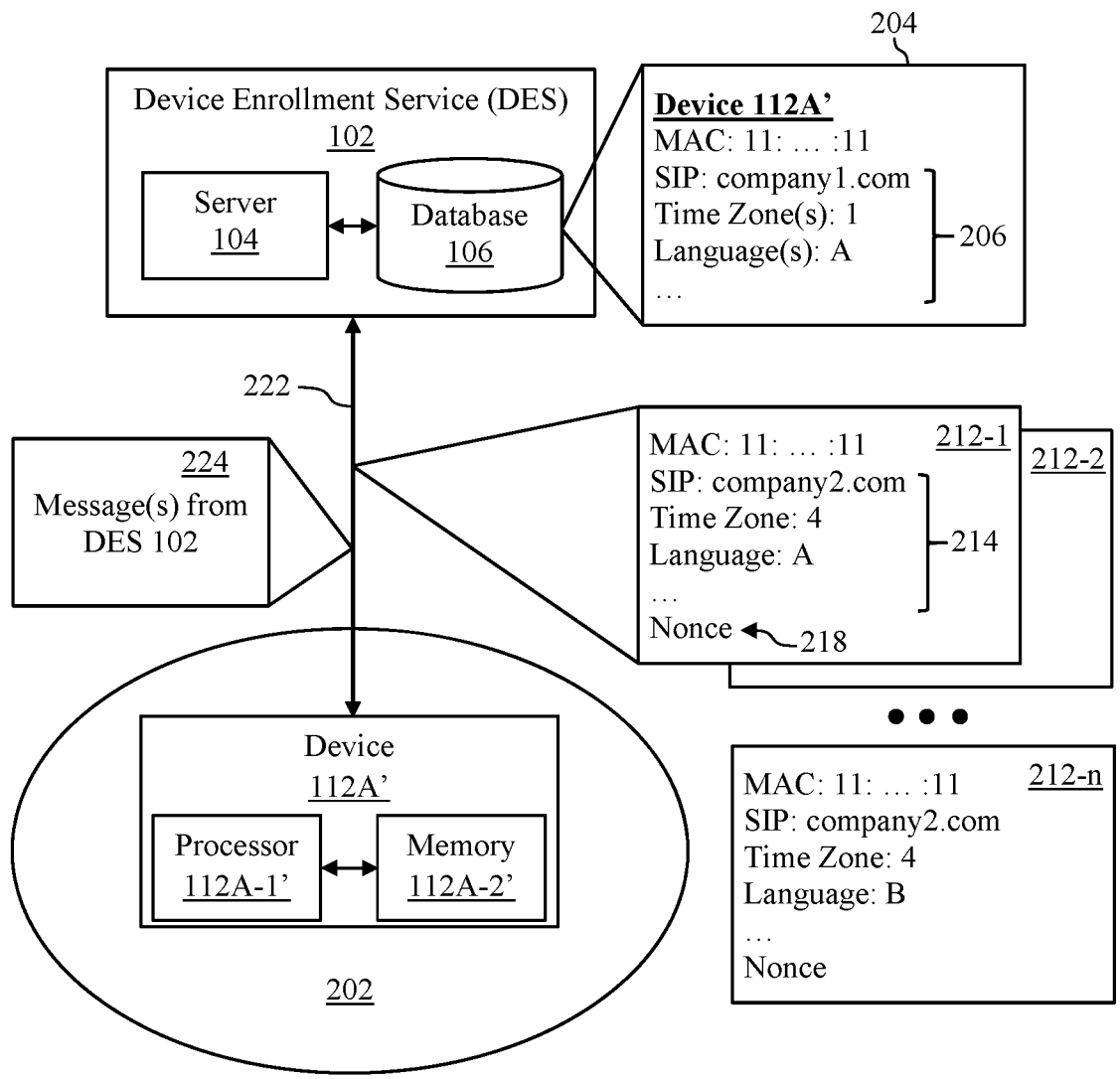
FIG. 2B depicts a second interaction in accordance with the present disclosure.

The device 112A' depicted in FIG. 2B establishes a secure communications channel 222 to DES 102 and generates and transmits one or more messages 212-1 to 212-n (collectively referred to herein as message(s) 212) comprising device data 214 in a manner substantially similar to that described above in detail with respect to the device 112A and message 208. The device data 214 contained in each message 212 may similarly be hashed with a nonce 218 generated by the device 112A'.

The device 112A, 112A' may automatically generate and transmit a message 208, 212 to DES 102 each time the device 112A, 112A' detects an occurrence of a predetermined event. For example, the predetermined event may comprise boot-up of the device 112A, 112A'. Upon detecting a boot-up, the processor 112A-1, 112A-1' of the device 112A, 112A' may execute the executable instructions stored in the memory 112A-2, 112A-2' to establish a secure communications channel 220, 222 with DES 102 by sending the device certificate to DES 102. Following establishment of the secure communications channel 220, 222, the device 112A, 112A' may generate and transmit the message 208-1, 212-1 to DES 102.

In other examples, the predetermined event that triggers the generation and transmission of a message 208, 212 may comprise elapse of a predetermined time, e.g., a week, a month, etc. For example, upon detecting that the device 112A, 112A' has been operating for the predetermined time without powering down, the executable instructions may cause the device 112A, 112A' to generate and transmit an additional message, e.g., message 208-2, 212-2, to DES 102. The device 112A, 112A' may store a log in the memory 112A-2, 112A-2' comprising the timestamp of previous message(s), e.g., message 208-1, 212-1, and based on elapse of the predetermined time since transmission of the previous message 208-1, 212-1, the device 112A, 112A' may automatically generate and transmit the additional message 208-2, 212-2. The additional message(s) 208-2, 212-2 may be important for detecting misuse of devices 112 that are powered down infrequently following the initial boot-up. In further examples, the predetermined event that triggers the generation and transmission of a message 208, 212 may comprise the device 112A, 112A' detecting a change in an IP address of a server to which the device 112A, 112A' is connected.

In some instances, a content of the message 208-1, 212-1 sent following boot-up may be the same as a content of the message(s) 208-2, 212-2 sent following other predetermined events. In other instances, the content may be different. For example, the message 208-1, 212-1 sent following boot-up may comprise data that is customer-specific and/or could potentially be used to identify a customer (e.g., the SIP domain), and the other message(s) 208-2, 212-2 may comprise data that is not customer-specific (e.g., the public address of a server to which the device 112A, 112A' is connected). The device 112A, 112A' may be configured to automatically alter the content of the messages 208, 212, or the content may be modified based on instructions received from DES 102, as explained herein.

With reference to FIGS. 2A and 2B, following establishment of the secure communications channel 220, 222 by the device 112A, 112A', DES 102 receives a message 208, 212 from the device 112A, 112A' that comprises a hash of the device data 210, 214. DES 102 then generates a hash of the stored data 204 with the same hashing algorithm used by the device 112A, 112A' to generate the hash of the device data 210, 214. For example, DES 102 may use a device identifier (e.g., a MAC address or serial number), which may be extracted from a device certificate provided by the device 112A, 112A' during establishment of the secure communications channel 220, 222, to locate and retrieve the stored data 204 associated with the device 112A, 112A', e.g., from the database 106. In instances in which the message 208, 212 includes the nonce 216, 218, generating the hash of the stored data 204 may comprise extracting the nonce 216, 218 from the respective message 208, 212 and hashing the stored data 204 and the nonce 216, 218. DES 102 may follow the same procedure regardless of whether the message 208, 212 is received from the device 112A, 112A' following boot-up, e.g., message 208-1, 212-1, or following a subsequent triggering event, e.g., message 208-2, 212-2.

In some cases, a device (not shown) that is not known to DES 102 may attempt to contact DES 102 and establish a secure communications channel. For example, the device may comprise a serial number and/or MAC address that is not stored in the database 106, in which case the hash of the certificate will not match any of the records associated with devices 112 known to DES 102. This device may be counterfeit, altered, or otherwise compromised and may be denied access to DES 102. DES 102 may extract and store some data from the device, such as the serial number and/or MAC address, in order to identify the device as having attempted to contact DES 102 and as being potentially malicious. In some examples, DES 102 may move the device to a quarantined environment so that additional interrogation and/or tracing of the device may be performed.

The hash of the stored data 204 is then compared with the hash of the device data 210, 214 to determine whether the device 112A, 112A' is a potential grey market device or is otherwise being used improperly. In instances in which the message 208, 212 further comprises posture-related data, a domain name, and/or a public address of the server to which the device 112A, 112A' is connected, DES 102 may extract this additional information from the message 208, 212 for comparison with the corresponding expected location and usage data 206.

With reference to FIG. 2A, the device 112A is deployed in region 200. Region 200 is an authorized deployment region for the device 112A, as specified in the agreement between the manufacturer 114 and the partner 122 (see FIG. 1). Thus, the device data 210 matches the expected location and usage data 206 stored by DES 102, such that the hash of the device data 210 contained in the message 208 matches the hash of the stored data 204 generated by DES 102. In addition, the domain name and/or public address of the server to which the device 112A is connected should match the expected location and usage data 206 generated by DES 102 because the device 112A is deployed in the authorized deployment region 200. DES 102 may log the message 208, along with the timestamp and an indication of a match, in the record associated with the device 112A.

However, the device 112A' in FIG. 2B is deployed in region 202, which is not an authorized deployment region specified in the agreement between the manufacturer 114 and the partner 122. Thus, one or more of the items in the device data 214, e.g., the SIP domain, time zone, configured language, etc., may be different from the expected location and usage data 206, such that the hash of the device data 214 contained in the message 212 does not match the hash of the stored data 204 generated by DES 102, e.g., there is a mismatch. There may also be a mismatch between the domain name and/or public address of the server provided in the message 212, as compared to the corresponding expected location and usage data 206 generated by DES 102 based on deployment in authorized deployment region 200. DES 102 may log the message 212, along with the timestamp and an indication of a mismatch, in the record associated with the device 112A'.

Alternatively or in addition, the data related to the posture of either device 112A, 112A' may indicate that the device 112A, 112A' is not being used in an expected or authorized manner, e.g., one or more features and/or services of the device 112A, 112A' may have been altered, i.e., enabled, disabled, added, and/or removed, in violation of the agreement under which the device 112A, 112A' was sold. For example, the device 112A may be deployed in the authorized deployment region 200, but the international calling feature may have been activated in violation of the agreement under which the device 112A was sold to the partner 122. In other examples, the device 112A, 112A' may comprise a hardware configuration that is not authorized for sale in the respective region 200, 202. For instance, the agreement between the manufacturer 114 and partner 122 may specify that a particular hardware configuration may be sold only in certain market(s)/region(s) and/or only to certain partner(s) 122 and/or customer(s) 116.

When the hash of the device data 210, 214 does not match the hash of the stored data 204 and/or the posture-related data, domain name, public address of the server, and/or any other data do not match the expected location and usage data 206, DES 102 may generate an alert, which may comprise a message that is sent to a system administrator for DES 102.

Generating the alert may optionally further comprise application of one or more rules. A rules database (not shown; may be separate from, or part of, the database 106) may comprise one or more rules that determine when an alert is generated. In some examples, a filter rule may require that an alert be generated only if a predetermined number of mismatches occur within a specified time period, e.g., based on the timestamps of a current message and one or more messages previously received by DES 102. In some instances, a device 112A may be properly sold in authorized deployment region 200, but the user may travel temporarily into (unauthorized) region 202, which may cause DES 102 to register a mismatch. When the user returns to the authorized deployment region 200, the hash of the device data 210 should once again match the hash of the stored data 204 and/or domain name and/or public address of the server should match the expected location and usage data 206. Based on application of the filter rule, DES 102 may not generate an alert if a current number of mismatches is less than the predetermined number of mismatches for the specified time period. In instances in which DES 102 is hosted or controlled by the device manufacturer 114, the application of the one or more rules may be performed by DES 102 or by another system (not shown) that is hosted or controlled by the device manufacturer 114. In instances in which DES 102 is hosted or controlled by a separate, third party entity, the application of the one or more rules may be performed by DES 102 or by another system (not shown) that is hosted or controlled by the third party entity.

In some examples, when there is a mismatch, DES 102 may use the MAC address or other unique identifier of the device 112A' to determine an entity, i.e., the partner 122 and/or customer 116, with which the device 112A' is associated. For example, the partner 122 and/or customer 116 may each maintain a profile in DES 102 that contains a list of device identifiers associated with the partner 122 and/or customer 116 and a list of authorized deployment regions for those devices 112. DES 102 may compare the device identifier of the device 112A' with the list of device identifiers and authorized deployment regions in the partner's and/or customer's profile. DES 102 may also use the data in the profile to identify instances in which the posture of the device 112A, 112A' or any other data does not match the data contained in the profile. For example, the device 112A, 112A' may comprise a hardware configuration that is not authorized for sale to that particular partner 122 or customer 116. In this manner, DES 102 may identify partners 122 that are selling devices in violation of their agreement with the manufacturer 114 and/or failing to take proper precautions when dealing with other entities, e.g., resellers 120. DES 102 may also identify partners 122 and/or customers 116 who are improperly using the devices.

In other examples, after the device 112A, 112A' has initiated contact with DES 102 and established the secure communications channel 220, 222, DES 102 may transmit one or more messages 224 to the device 112A, 112A', as shown in FIGS. 2A and 2B. The message(s) 224 may comprise, for example, instructions regarding the device data 210, 214 to send in a subsequent message 208, 212. For example, a current message 208-1, 208-2 may comprise only customer-specific data (e.g., the SIP domain), and DES 102 may instruct the device 112A, 112A' to send different data, such as the public address of a server to which the device 112A, 112A' is connected, the next time the device 112A, 112A' sends a message 208-2, 212-2.

DES 102 as described herein may also be used to locate devices 112 that have been lost or stolen. For example, if the device 112A is reported as being lost or stolen, DES 102 may flag the record associated with the device 112A. The next time the device 112A contacts DES 102, an alert may be generated, and the location of the device 112A may be provided to the appropriate entity (i.e., the partner 122 and/or customer 116) and/or to the appropriate authorities to allow recovery of the device 112A.

Figure 3:
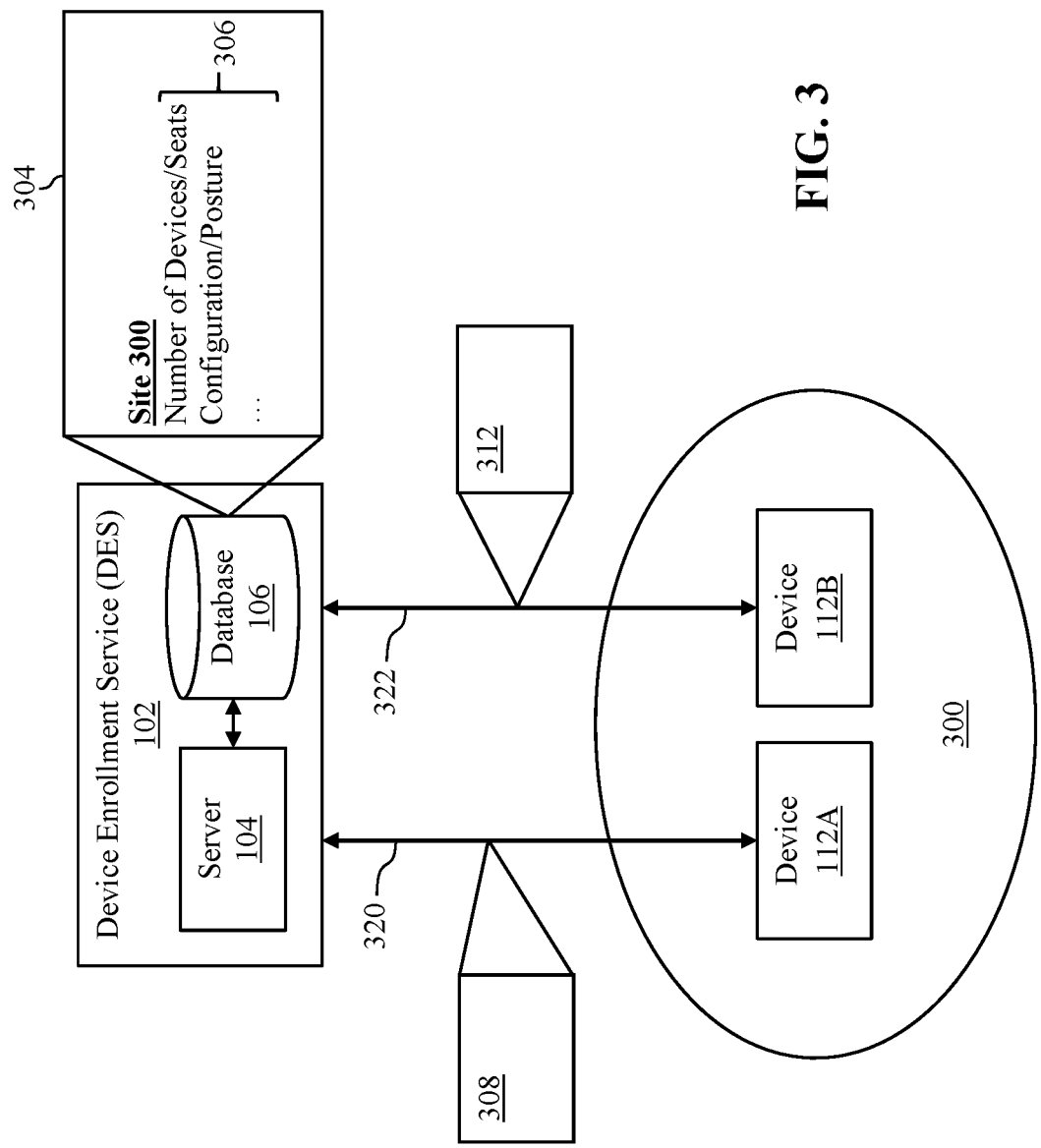
FIG. 3 depicts a third interaction in accordance with the present disclosure.

With reference to FIG. 3, in further examples, two or more devices, e.g., devices 112A, 112B may be deployed in a region or site, which is represented by reference numeral 300, and DES 102 may use data sent by the devices 112A, 112B to monitor site-wide parameters and conduct an audit of the devices 112A, 112B present at the site 300 and their usage. Although only two devices 112A, 112B are shown in FIG. 3, it is understood that the site 300 may include any number of devices. The database 106 associated with DES 102 may include a record with stored data 304 that comprises expected data 306 for some or all of the devices 112A, 112B deployed at the site 300, such as an expected number of devices 112A, 112B or "seats" for the site 300, an expected configuration or posture for the devices 112A, 112B (e.g., the features and/or services to be activated), and the like. For instance, the agreement under which the devices 112A, 112B were supplied to the site 300 may include licenses for 100 devices and 75 licenses for a certain feature/service. In other instances, the agreement under which the devices 112A, 112B were supplied to the site 300 may specify usage based on time, e.g., 200 seats during one or more peak time periods such as the holidays and 100 seats during all other non-peak time periods.

Each device 112A, 112B at the site 300 may establish a respective secure communications channel 320, 322 with DES 102 and generate and transmit a respective message 308, 312 in the same manner as described above with respect to the devices 112A, 112A' in FIGS. 2A and 2B. Although only one message 308, 312 is shown, it is understood that each device 112A, 112B may transmit multiple messages. Each message 308, 312 may comprise a device identifier, a current SIP domain, a public server address, and/or any device data described herein, some or all of which may be hashed, as described above. DES 102 receives these messages 308, 312 and may generate a hash of the stored data 304 (when necessary), also as described above. DES 102 may then extract one or more pieces of data from the messages 308, 312 and compare it to the stored data 304 to detect any anomalies at the site 300. For example, the stored data 304 may indicate that 100 devices are expected at the site 300, but the data received from the devices 112A, 112B (e.g., the device identifiers) may indicate that there are 105 devices present at the site 300, which is a violation of the agreement for the site 300. The stored data 304 may also indicate that only 75 devices should have a particular service/feature activated, but the data received from the devices 112A, 112B may indicate that there are 85 devices in which the particular service/feature is activated. In other examples, the stored data 304 may indicate that only 100 seats should be in use at the site 300 at the time the messages 308, 312 were received, but the data received from the devices 112A, 112B may indicate that 200 seats are currently in use at the site 300.

When there is a mismatch between the data from the messages 308, 312 and the stored data 304 for the site 300, DES 102 may generate an alert, which may comprise a message that is sent to a system administrator for DES 102. An alert may also be sent to a billing department (not shown) so that appropriate action may be taken regarding the unauthorized use of additional devices/seats, services, and/or features at the site 300.

Figure 4A:
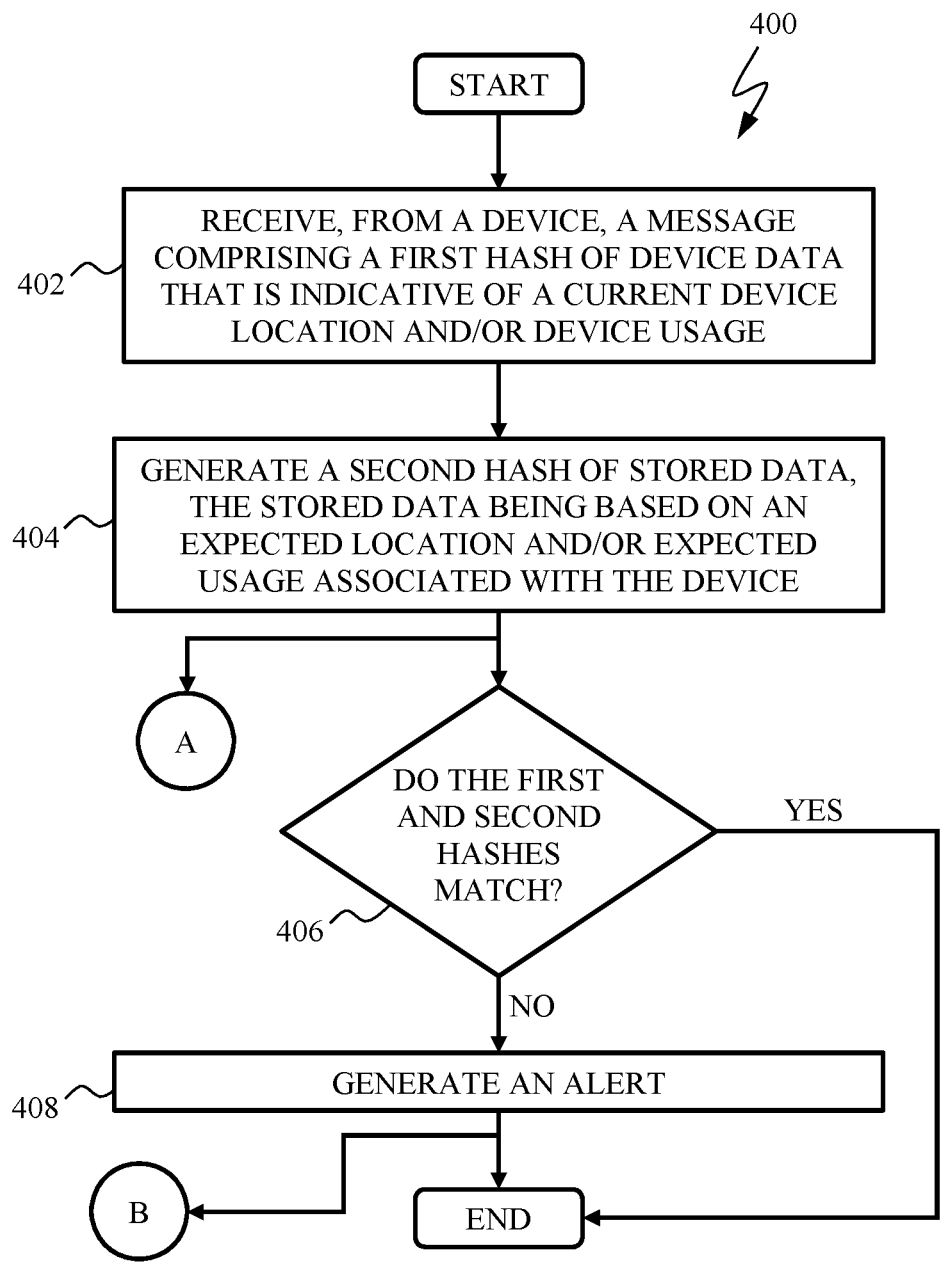
FIGS. 4A-4E are flowcharts of exemplary methods for detecting misuse of a device.

FIGS. 4A-4E, 5A, and 5B illustrate exemplary methods in accordance with the present disclosure. The methods set out in FIGS. 4A-4E may be performed all or in part by a processor of a system, e.g., by a processor of the server 104, that is in communication with a memory device, e.g., the database 106 or other computer-readable storage medium, and executes instructions stored in the memory device. With reference to FIG. 4A, a method 400 for detecting misuse of devices begins at Step 402 in which a message is received from a device, the message comprising a first hash of device data that is indicative of a current device location and/or a current device usage. At Step 404, a second hash of stored data is generated, with the stored data being based on an expected location and/or expected usage associated with the device. The first hash of device data is compared to the second hash of stored data at Step 406. When the first and second hashes match, the method may conclude. When the first and second hashes do not match, an alert is generated at Step 408, after which the method 400 may conclude.

The stored data may be retrieved based on a unique identifier (e.g., a MAC address, serial number, etc.) extracted from a device certificate provided by the device (e.g., during establishment of a secure communications channel 220, 222). In some examples, the first hash of device data may comprise a hash of the device data and a nonce that is generated by the device. The message may further comprise the nonce, and the second hash of stored data is generated by hashing the stored data and the nonce. The stored data may be based on an authorized deployment region for the device.

Figure 4B:
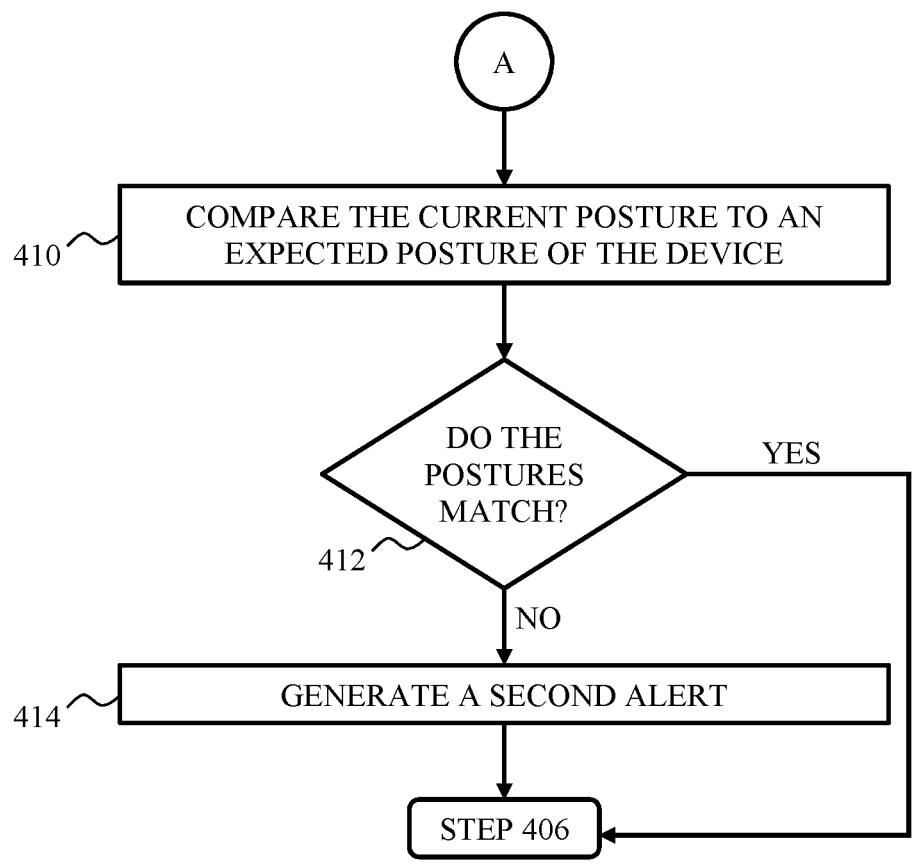
Figure 4C:
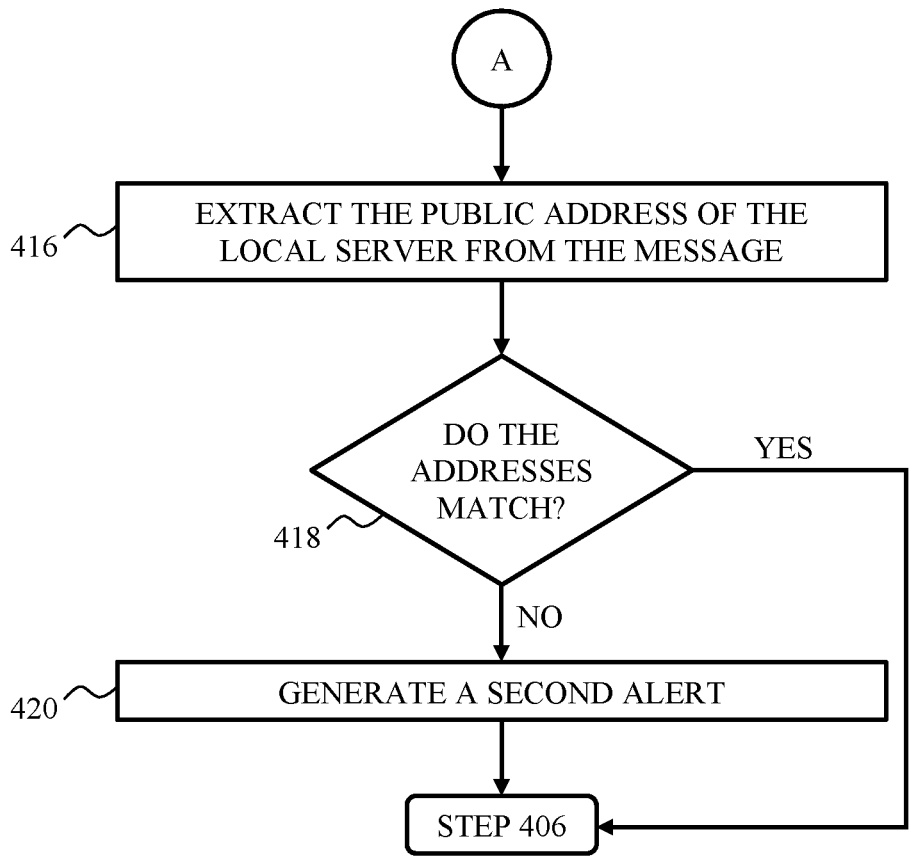
Figure 4D:
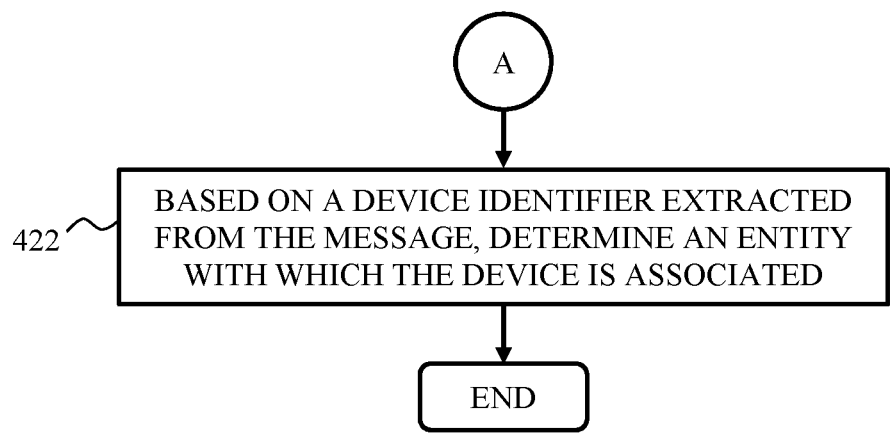

FIGS. 4B-4D illustrate additional, optional functions that may be performed following receipt of the message in Step 402 of FIG. 4A. While Steps 410-414 of FIG. 4B, Steps 416-420 of FIG. 4C, and 422 of FIG. 4D are depicted as occurring between Steps 404 and 406 of FIG. 4A, it is understood that these Steps may occur prior to, after, or simultaneously with Steps 404-408 in FIG. 4A.

In some examples as shown in FIG. 4B, the message may further comprise a current posture of the device, and the method may optionally comprise comparing the current posture of the device to an expected posture of the device at Step 410. When the current and expected postures match, the method may resume in FIG. 4A. When the current and expected postures do not match, a second alert may be generated at Step 414, after which the method may resume in FIG. 4A.

In other examples as shown in FIG. 4C, the message may further comprise a public address of a local server to which the device is connected, and the method may optionally comprise extracting the public address of the local server from the message in Step 416 in FIG. 4C. At Step 418, the public address of the local server is compared to an expected address in Step 418, in which the expected address of the local server is based on an authorized deployment region for the device. When the addresses match, the method may resume in FIG. 4A. When the addresses do not match, a second alert may be generated at Step 420, after which the method may resume in FIG. 4A.

In further examples as shown in FIG. 4D, the method may further optionally comprise determining in Step 422, based on a device identifier extracted from the message device certificate provided by the device, an entity with which the device is associated.

Figure 4E:
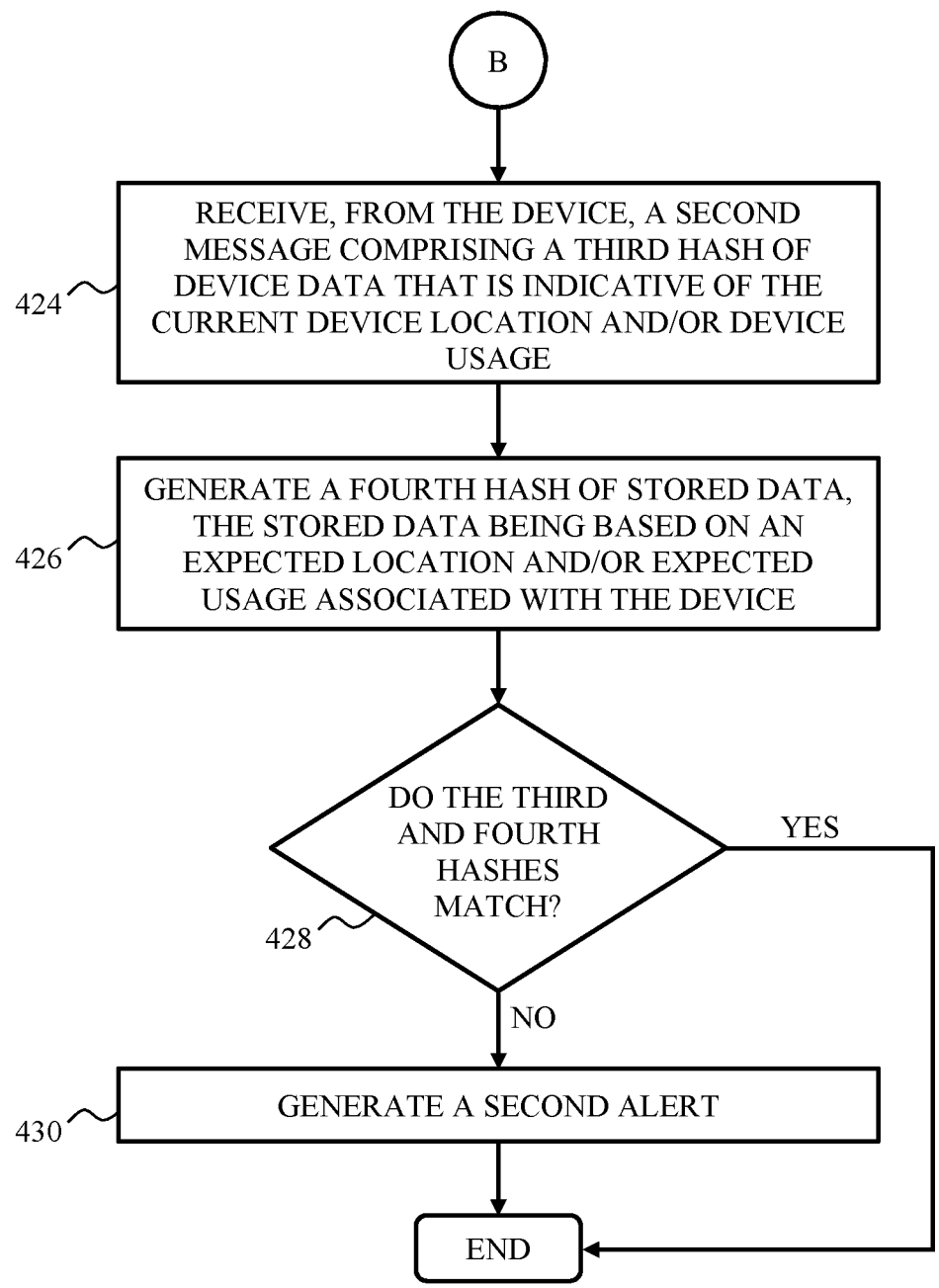

Following receipt of the first message, the method may optionally further comprise receiving from the device, a second message comprising a third hash of device data that is indicative of the current device location and/or device usage at Step 424 in FIG. 4E. At Step 426, a fourth hash of stored data is generated, with the stored data being based on the expected location and/or expected usage associated with the device. At Step 428, the third and fourth hashes are compared. When the third and fourth hashes match, the method may conclude. When the third and fourth hashes do not match, a second alert may be generated at Step 430, after which the method may conclude. In some examples, the device data contained in the second message is different from the device data contained in the first message.

Figure 5A:
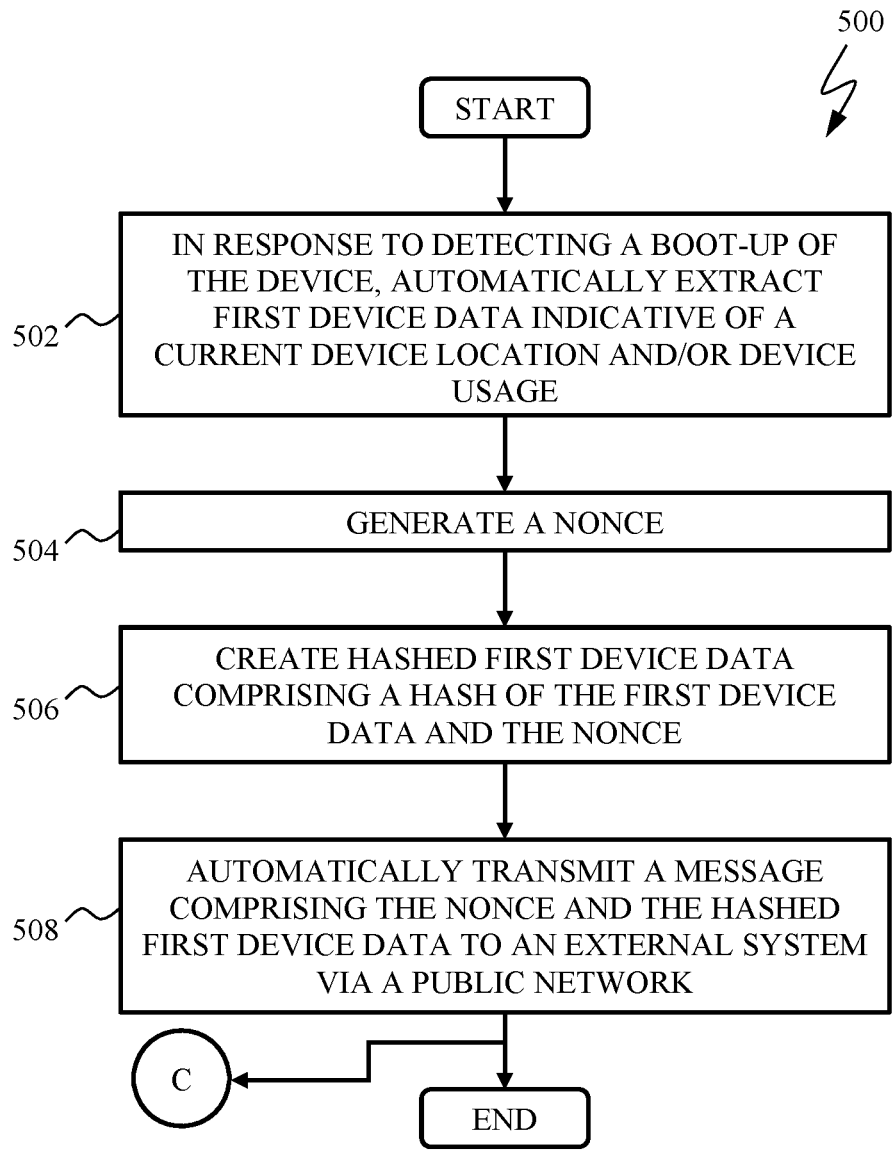
FIGS. 5A and 5B are flowcharts of exemplary methods for automatically generating one or more messages.
Figure 5B:
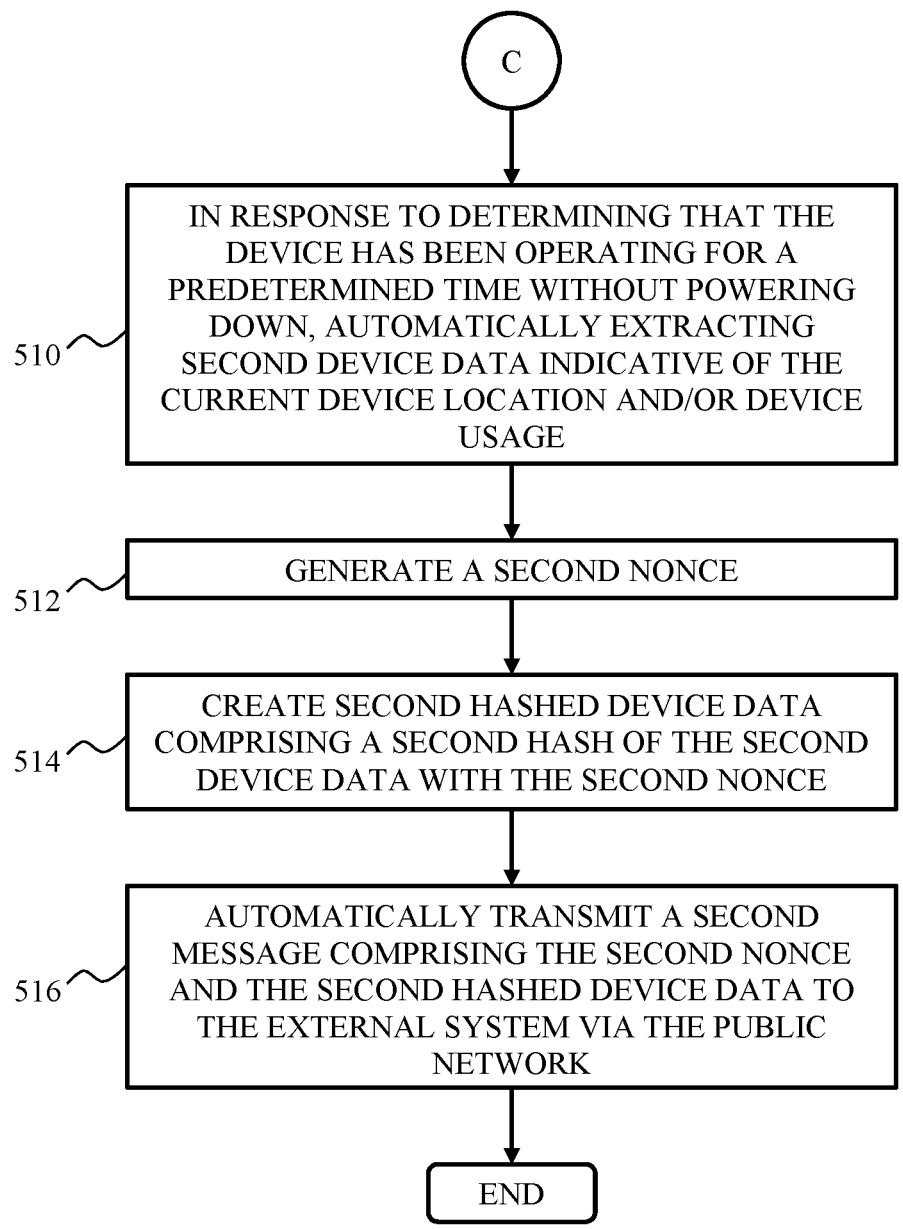

The methods set out in FIGS. 5A and 5B may be performed all or in part by a processor of a device, e.g., by a processor 112A-1, 112A-1' of the device 112A, 112A', that is in communication with a memory device, e.g., the memory 112A-2, 112A-2', and executes instructions stored in the memory device. With reference to FIG. 5A, a method 500 for automatically generating one or more messages begins at Step 502 in which, in response to detecting a boot-up of the device, first device data indicative of a current device location and/or device usage is automatically extracted. At Step 504, a nonce is generated, and at Step 506, hashed first device data is created that comprises a hash of the first device data and the nonce. At Step 508, a message comprising the nonce and the hashed first device data is automatically transmitted to an external system via a public network, e.g., to DES 102 via the Internet 110, after which the method 500 may conclude.

After generating the first message, the method may optionally further comprise, in response to determining that the device has been operating for a predetermined time without powering down, automatically extracting second device data indicative of the current device location and/or device usage at Step 510. At Step 512, a second nonce is generated, and at Step 514, second hashed device data is created that comprises a second hash of the second device data with the second nonce. At Step 516, a second message comprising the second nonce and the second hashed device data is automatically transmitted to the external system via the public network. In some examples, the second device data is different from the first device data.

The flowchart(s) and block diagram(s) in the Figures illustrate the architecture, functionality, and operation of possible implementations of systems, methods and computer program products according to various aspects of the present disclosure. In this regard, each block in the flowchart(s) or block diagram(s) may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may include, but is not limited to, an electronic, magnetic, optical, electromagnetic, or semiconductor system, apparatus, or device, or any suitable combination thereof. More specific examples may include an electrical connection having one or more wires; a floppy disk; a flexible disk; a hard disk; magnetic tape or any other magnetic medium; a magneto-optical medium; a random access memory (RAM); a read-only memory (ROM); an erasable programmable read-only memory (EPROM or Flash memory); a solid state medium like a memory card, chip, or cartridge; a portable compact disc read-only memory (CD-ROM); an optical storage device; an optical fiber; or any suitable combination thereof. A digital file attachment to email or other self-contained information archive or set of archives may be considered a distribution medium equivalent to a tangible storage medium. When the computer-readable media is configured as a database, it is to be understood that the database may be any type of database, such as relational, hierarchical, object-oriented, and/or the like. In the context of this document, a computer-readable storage medium may be any tangible storage medium or distribution medium and prior art-recognized equivalents and successor media that may contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer-readable medium that when executed may direct a computer, other programmable data processing apparatus, or other devices to function in a particular manner, such that the instructions when stored in the computer-readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined into one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communication devices, at one or more users' premises, or some combination thereof. Similarly, one or more functional portions of the system could be distributed between a telecommunication device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A system comprising:
a memory storing executable instructions; and
a processor in communication with the memory, wherein the processor when executing the executable instructions:
receives, from a device, a device certificate comprising a unique identifier;
based on an authorized deployment region for the device, generates stored data comprising at least one of an expected location for the device or an expected usage of the device;
associates the stored data with the device using the unique identifier extracted from the device certificate;
subsequently receives, from the device, a first message comprising first data, wherein the first data comprises the device certificate with the unique identifier and a first hash of device data that is indicative of at least one of a current device location or a current device usage, the device data comprising at least one of a current Session Initiation Protocol (SIP) domain of the device, a current time zone in which the device is located, data related to a current posture of the device, a configured language of the device, a dialing configuration of the device for emergency numbers, or a dial plan of the device;

using the unique identifier, retrieves the stored data associated with the device;

after receiving the first message, transmits, to the device, instructions to transmit a second message comprising second data that is different from the first data, wherein the second data comprises at least one of a hardware configuration of the device, a Domain Name System (DNS) domain name, a public Internet Protocol (IP) address of a DNS server, or a public IP address of a Network Time Protocol (NTP) server;

receives, from the device, the second message;

for the first message:
generates a second hash of one or more first corresponding portions of the stored data; and
compares the first and second hashes;

for the second message:
compares the second data to one or more second corresponding portions of the stored data; and
when at least one of (i) the first and second hashes do not match, or (ii) the second data and the one or more second corresponding portions of the stored data do not match, generates an alert.

2. The system of claim 1, wherein:
the first hash of device data comprises a hash of the device data and a nonce; and
the first message further comprises the nonce, the second hash of stored data being generated by hashing the one or more first corresponding portions of the stored data and the nonce.

3. The system of claim 1, wherein the second message comprises the public IP address of the DNS server or the NTP server to which the device is connected, and wherein the processor, when executing the executable instructions:
extracts the public IP address of the DNS server or the NTP server from the second message; and
compares the public IP address to an expected address, wherein the expected address is based on the authorized deployment region for the device.

4. The system of claim 1, wherein the processor, when executing the executable instructions:
based on the unique identifier extracted from the device certificate provided by the device in the first message, determines an entity with which the device is associated.

5. The system of claim 1, wherein the device data contained in the first message comprises customer-specific data and the second data contained in the second message comprises non-customer-specific data.

6. The system of claim 1, wherein the first message comprises data related to the current posture of the device, and wherein the processor, when executing the executable instructions:
compares the current posture to an expected posture of the device.

7. A method comprising:
receiving, by a processor, from a device, a device certificate comprising a unique identifier;
based on an authorized deployment region for the device, generating, by the processor, stored data comprising at least one of an expected location for the device or an expected usage of the device;
associating, by the processor, the stored data with the device using the unique identifier extracted from the device certificate;
subsequently receiving, by the processor, from the device, a first message comprising first data, wherein the first data comprises the device certificate with the unique identifier and a first hash of device data that is indicative of at least one of a current device location or a current device usage, the device data comprising at least one of a current Session Initiation Protocol (SIP) domain of the device, a current time zone in which the device is located, data related to a current posture of the device, a configured language of the device, a dialing configuration of the device for emergency numbers, or a dial plan of the device;

using the unique identifier, retrieving, by the processor, the stored data associated with the device;

after receiving the first message, transmitting, by the processor, to the device, instructions to transmit a second message comprising second data that is different from the first data, wherein the second data comprises at least one of a hardware configuration of the device, a Domain Name System (DNS) domain name, a public Internet Protocol (IP) address of a DNS server, or a public IP address of a Network Time Protocol (NTP) server;

receiving, by the processor, from the device, the second message;

for the first message:
generating, by the processor, a second hash of one or more first corresponding portions of the stored data; and
comparing, by the processor, the first and second hashes;

for the second message:
comparing, by the processor, the second data to one or more second corresponding portions of the stored data; and
when at least one of (i) the first and second hashes do not match, or (ii) the second data and the one or more second corresponding portions of the stored data do not match, generating, by the processor, an alert.

8. The method of claim 7, wherein:
the first hash of device data comprises a hash of the device data and a nonce, the nonce being generated by the device; and
the first message further comprises the nonce, the second hash of stored data being generated by hashing the one or more first corresponding portions of the stored data and the nonce.

9. The method of claim 7, wherein the first message comprises data related to the current posture of the device and the second message comprises the public IP address of the DNS server or the NTP server to which the device is connected, the method further comprising:
extracting, by the processor, the public IP address of the DNS server or the NTP server from the second message; and
comparing, by the processor, the current posture to an expected posture and the public IP address to an expected address, wherein the expected address is based on the authorized deployment region for the device.

10. The method of claim 7, further comprising:
based on the unique identifier extracted from the device certificate provided by the device in the first message, determining, by the processor, an entity with which the device is associated.

11. The method of claim 7, wherein the device data contained in the first message comprises customer-specific data and the second data contained in the second message comprises non-customer-specific data.

12. A non-transitory computer-readable medium comprising instructions that when executed, cause a processor of a device to:
in response to detecting a boot-up of the device, automatically extract first device data indicative of at least one of a current device location or a current device usage, wherein the first device data comprises a first data type, the first device data comprising at least one of a current Session Initiation Protocol (SIP) domain of the device, a current time zone in which the device is located, data related to a current posture of the device, a configured language of the device, a dialing configuration of the device for emergency numbers, or a dial plan of the device;
generate a nonce;
create hashed first device data comprising a hash of the first device data and the nonce;
automatically transmit a first message comprising a device certificate, the nonce, and the hashed first device data to an external system via a public network;
after transmitting the first message, receiving, from the external system, a second message comprising instructions to send second device data, wherein the second device data comprises a second data type that is different from the first data type, the second device data comprising at least one of a hardware configuration of the device, a Domain Name System (DNS) domain name, a public Internet Protocol (IP) address of a DNS server, or a public IP address of a Network Time Protocol (NTP) server; and
transmitting, to the external system via the public network, a third message comprising the device certificate, a second nonce, and the second device data.

13. The non-transitory computer-readable medium of claim 12, wherein the instructions when executed, cause the processor of the device to:
in response to determining that the device has been operating for a predetermined time without powering down, automatically extracting additional device data indicative of at least one of the current device location or the current device usage;
generate an additional nonce;
create additional hashed device data comprising an additional hash of the additional device data with the additional nonce; and
automatically transmit an additional message comprising the device certificate, the additional nonce, and the additional hashed device data to the external system via the public network.

14. The non-transitory computer-readable medium of claim 12, wherein the first data type comprises customer-specific data and the second data type comprises non-customer-specific data.

15. A system comprising:
a memory storing executable instructions; and
a processor in communication with the memory, wherein the processor when executing the executable instructions:
receives, from a device, a first message comprising first data, wherein the first data comprises a first hash of device data that is indicative of at least one of a current device location or a current device usage, the device data comprising at least one of a current Session Initiation Protocol (SIP) domain of the device, a current time zone in which the device is located, data related to a current posture of the device, a configured language of the device, a dialing configuration of the device for emergency numbers, or a dial plan of the device;
retrieves stored data associated with the device, wherein the stored data is based on an authorized deployment region for the device, the authorized deployment region comprising at least one of (i) an authorized location associated with the device, or (ii) an authorized configuration and posture associated with the device;
after receiving the first message, transmits, to the device, instructions to transmit a second message comprising second data that is different from the first data, wherein the second data comprises at least one of a hardware configuration of the device, a Domain Name System (DNS) domain name, a public Internet Protocol (IP) address of a DNS server, or a public IP address of a Network Time Protocol (NTP) server;
receives, from the device, the second message;
for the first message:
generates a second hash of one or more first corresponding portions of the stored data; and
compares the first and second hashes;
for the second message:
compares the second data to one or more second corresponding portions of the stored data; and
when at least one of (i) the first and second hashes do not match, or (ii) the second data and the one or more second corresponding portions of the stored data do not match, generates an alert.

16. A system comprising:
a memory storing executable instructions; and
a processor in communication with the memory, wherein the processor when executing the executable instructions:
receives, from a device, a first message comprising a first hash of device data that is indicative of at least one of a current device location or a current device usage, wherein the device data comprises at least one of a current Session Initiation Protocol (SIP) domain of the device, a current time zone in which the device is located, data related to a current posture of the device, a configured language of the device, a dialing configuration of the device for emergency numbers, or a dial plan of the device;
after receiving the first message, transmits, to the device, instructions to transmit a second message comprising second data that is different from the first data, wherein the second data comprises at least one of a hardware configuration of the device, a Domain Name System (DNS) domain name, a public Internet Protocol (IP) address of a DNS server, or a public IP address of a Network Time Protocol (NTP) server;
receives, from the device, the second message;
for the first message:
generates a second hash of one or more first corresponding portions of stored data, the stored data being based on at least one of an expected location or an expected usage associated with the device; and
compares the first and second hashes;
for the second message:
compares the second data to one or more second corresponding portions of the stored data;
when at least one of (i) the first and second hashes do not match, or (ii) the second data and the one or more second corresponding portions of the stored data do not match, registers a mismatch;

determines a total number of mismatches for the device within a time period; and generates an alert only when the total number of mismatches for the device is greater than a predetermined number.

17. A system for detecting grey market activities, the system comprising:

a memory storing executable instructions; and a processor in communication with the memory, wherein the processor when executing the executable instructions:

receives, from a device, a first message comprising first data, wherein the first data comprises a first hash of device data that is indicative of at least one of a current device location or a current device usage, the device data comprising at least one of a current Session Initiation Protocol (SIP) domain of the device, a current time zone in which the device is located, data related to a current posture of the device, a configured language of the device, a dialing configuration of the device for emergency numbers, or a dial plan of the device;

after receiving the first message, transmits, to the device, instructions to transmit a second message comprising second data that is different from the first data, wherein the second data comprises at least one of a hardware configuration of the device, a Domain Name System (DNS) domain name, a public Internet Protocol (IP) address of a DNS server, or a public IP address of a Network Time Protocol (NTP) server;

receives, from the device, the second message;

for the first message:

generates a second hash of one or more first corresponding portions of stored data, the stored data being based on at least one of an authorized location for the device or an authorized usage associated with the device; and compares the first and second hashes;

for the second message:

compares the second data to one or more second corresponding portions of the stored data; and when at least one of (i) the first and second hashes do not match, or (ii) the second data and the one or more second corresponding portions of the stored data do not match, generates an alert indicating that the device is a potential grey market device with at least one of an unauthorized location or an unauthorized use.

* * * * *